United States Patent [19]
Holsappel

[11] Patent Number: 4,578,329
[45] Date of Patent: Mar. 25, 1986

[54] METHOD OF MARKING AN ARTICLE HAVING AT LEAST A POLYOLEFIN SURFACE AND AN ARTICLE HAVING A POLYOLEFIN SURFACE PROVIDED WITH A BLACK MARK OF DECOMPOSED POLYOLEFIN

[75] Inventor: Albert Holsappel, Hardenberg, Netherlands

[73] Assignee: Wavin B.V., Netherlands

[21] Appl. No.: 554,803

[22] Filed: Nov. 23, 1983

[30] Foreign Application Priority Data

Nov. 26, 1982 [NL] Netherlands ............... 8204604

[51] Int. Cl.[4] .............. B23K 26/18; B65D 1/00; B05D 3/06; G03C 1/72
[52] U.S. Cl. ........................... 430/18; 430/945; 430/270; 430/292; 219/121 LH; 219/121 LJ; 206/459; 428/187; 427/53.1
[58] Field of Search ............ 219/121 LH, 121 LJ; 430/18, 945, 270, 292; 206/459; 428/187; 427/53.1

[56] References Cited

U.S. PATENT DOCUMENTS 4,323,317 4/1982 Hasegawa ............... 219/121 LH X
4,328,303 5/1982 Ronn et al. ................. 430/945 X

FOREIGN PATENT DOCUMENTS 0036680 9/1981 European Pat. Off. .

OTHER PUBLICATIONS

"Laser Marking" *Research Disclosure*, No. 16363, Nov. 1977, p. 68.
R. K. Agnihotri, H. C. Kluge and F. P. Laming, "Method for Patterning Resists", *IBM Technical Disclosure Bulletin* vol. 21, No. 4, Sep. 1978, p. 1475.
"CI-77007", *Colour Index*, third edition, The Society of Dyers and Colourists, (Lund Humphries, Bradford and London, Great Britain, 1971), vol. 4, p. 4653.

*Primary Examiner*—John E. Kittle
*Assistant Examiner*—Cynthia Hamilton
*Attorney, Agent, or Firm*—Wigman & Cohen

[57] ABSTRACT

This invention concerns a method of marking articles having a polyolefin surface by exposure to a laser beam. The polyolefin contains a sufficient amount of a laser radiation absorbing substance for decomposing the polyolefin, so that a black mark of decomposed polyolefin will be formed.

The laser radiation absorbing substance is a silicon compound, preferably a metal silicate, e.g. calcium-metasilicate or kaoline.

The invention also comprises an article having a polyolefin surface, provided with a black mark of decomposed polyolefin formed by a laser beam.

17 Claims, 2 Drawing Figures

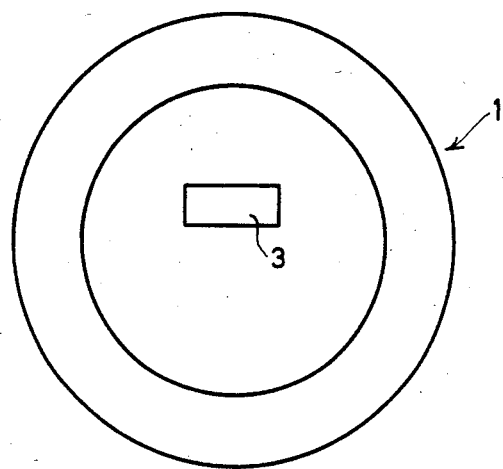
Fig: 1.
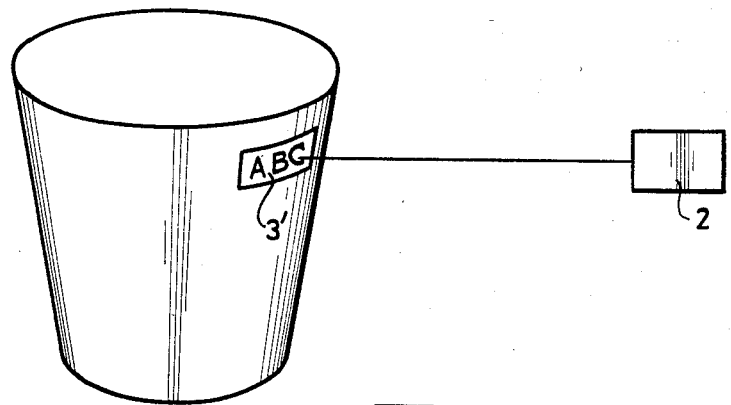
Fig: 2.

METHOD OF MARKING AN ARTICLE HAVING AT LEAST A POLYOLEFIN SURFACE AND AN ARTICLE HAVING A POLYOLEFIN SURFACE PROVIDED WITH A BLACK MARK OF DECOMPOSED POLYOLEFIN

BACKGROUND OF THE INVENTION

1. Field of the Invention

The present invention relates to a method of marking an article having at least a polyolefin, preferably polyethylene or polypropylene, surface by exposing said surface to the action of a laser beam.

2. Description of the Prior Art

It is known in the art to provide plastic materials in the form of containers, covers of containers and similar articles with a mark, by subjecting the plastic material to the action of a laser beam. Polyvinylchloride and polystyrene absorb the energy of such a laser beam so that the surface of the plastic materials is heated to a temperature involving decomposition of the plastic thus providing a black colored mark consisting of decomposed plastics.

Additives added to these plastics in order to obtain the desired properties and color do not hamper the laser beam action.

Plastic materials consisting of polyolefins, such as polypropylene and polyethylene, have the drawback, however, that they cannot be marked in the same way by means of a laser beam. This is particularly disadvantageous as on the one hand polypropylene and polyethylene due to their easy working and the attractive appearance which they give to packings are used on a large scale for packing foods, while on the other hand manufacturers of food who have to apply a well legible mark on packages etc., for instance, the date of final consumption, the production date or other similar marks cannot apply these marks on the respective materials, by means of a laser beam.

Up till now marking of polyolefin surfaces is obtained by subjecting polyolefin surfaces containing a dye, to the action of a laser beam which destroys the dye, so that the mark consists of discoloured parts of the container.

SUMMARY OF THE INVENTION

The present invention aims to provide a method of the abovementioned type which does not present these disadvantages and provides the surface with a black mark of decomposed polyolefin.

This aim is attained according to the invention in that the polyolefin contains a laser radiation absorbing substance in an amount sufficient for decomposing the polyolefin by the laser beam energy.

By adding a sufficient amount of laser radiation absorbing substance to the polyolefin due to the energy of the laser beam the polyolefin surface is heated and thus the polyolefin is locally decomposed, thereby forming the desired black mark.

Preferably the amount of added laser radiation absorbing substance is comprised between 0.5 and 5% by weight, more particularly between 1 and 2% by weight.

Very suitable laser radiation absorbing substances are silicon compounds such as silicates, more particularly metal silicates. Calcium metasilicate or an aluminium silicate; more particularly kaoline is preferred.

It has been found that the addition of 0.5% of calciummetasilicate or an aluminium silicate in the form of kaoline is just still sufficient to obtain a legible black mark of decomposed polyolefin by means of a laser beam with a carbondioxide laser, which mark is improved by applying 1 to 2% of the abovementioned substances.

Above 5% the added laser radiation absorbing substances have a negative influence on the deformation and other properties, so that this limit should not be exceeded if the polyolefin material is used for packing foods in containers formed of such polyolefin material. Moreover, above these percentages the added laser radiation absorbing substances will migrate from the polyolefin material into the packed material such as foods, which is not admissible.

The polyolefin article to be subjected to the marking by means of laser radiation is preferably a container or a cover for a container for packing food.

The present invention is also embodied in an article having at least a polyolefin surface, preferably polyethylene or polypropylene, provided with a mark obtained by exposing said surface to the action of a laser beam, in which the mark comprises decomposed polyolefin.

For marking polyolefin articles with a black mark of decomposed polyolefin according to the invention advantageously a TEA-carbondioxide pulsed laser is used.

The features of the present invention which are believed to be novel are set forth with particularity in the appended claims.

Other claims and many of the attendant advantages will be more readily appreciated as the same becomes better unterstood by reference to the following detailed description and considered in connection with the accompanying drawings in which like reference symbols designate like parts throughout the figures.

SURVEY OF THE DRAWINGS

FIG. 1 shows an upper view of a cover for a polyolefin container and

FIG. 2, in perspective view, a polyolefin container suitable for packing foods, with a TEA-carbondioxide pulsed laser.

DETAILED DESCRIPTION OF A PREFERRED EMBODIMENT

FIG. 1 shows a cover 1 of polypropylene for a plastic container.

The polypropylene contains 2% of calciummetasilicate which does not impair the deforming properties of the polypropylene during molding of the cover, while moreover, the added silicate is not able to migrate from the plastic material into food packed in a container provided with such a cover.

By means of a carbondioxide laser 2 the cover may be provided with a mark 3 consisting of black, decomposed polyolefin.

FIG. 2 shows a container 4 of polyethylene, the polyethylene of said container containing 2% of aluminium silicate in the form of kaoline.

By means of a TEA-carbondioxide pulsed laser 2 having an intensity of at least 1000 kW/cm$^2$ a pulse duration of 0.1-4 microseconds and a frequency of 0.1 to 100 Hz, the container may be provided with a black mark 3' of decomposed polyethylene, The amount of pulses of the laser may be 1-5.

The mark 3' of the container obtained by action of the laser is provided with characters a, b, c being black due to the decomposition of the polyolefins, whilst the remaining material around said mark has the original color of the whole container.

EXAMPLE I 100 kg polyethylene is mixed with 2 kg of calcium-metasilicate, 0.5 to 0.75 kg of glycerolmonosterate and 2.5 to 3 kg titaniumoxide as coloring agent and this mixture is extruded by means of an extruder, to a sheet. Covers or containers are formed from this sheet by deepdrawing.

By means of a TEA-carbondioxide pulsed laser the cover or containers are excellently provided with a black mark on a white surface formed by decomposition of the polyethylene. The pulsed laser has a beam diameter of 30×30 mm, the pulse duration in this example was 1 microsecond and the pulse contents was 3 Joules. The frequency was 10 Hz and the intensity of the pulse 333 kW/cm$^2$. The intensity on the article was about 12000 kW/cm$^2$.

EXAMPLE II

Example I is repeated but now 6 kg of calcium-metasilicate are added. The obtained material is badly deformable and presents, moreover, migration of said silicate into the product packed in such a container.

Thus this composition is less suitable for manufacturing containers to be provided with a mark by means of a laser beam.

EXAMPLE III

By adding 0.3 kg of calciummetasilicate to 100 kg of the polypropylene composition as mentioned in Example I, no well legible black mark is obtained by the action of the laser beam.

EXAMPLE IV

Example I is repeated thereby replacing calciumsilicate with aluminum silicate and polyethylene with polypropylene.

The addition of 6 kg of kaoline also provides a plastic composition which is difficultly deformable and shows moreover migration of the added substance to the product to be packed in such a container.

On the other hand no well legible black mark is obtained by the action of a carbondioxide laser beam upon a plastic composition containing only 0.3 kg of kaoline per 100 kg of polypropylene.

An excellent black mark is, however, obtained with a container of polypropylene containing 1 kg of kaoline by exposing the surface to the action of a laser beam according to example I.

What is claimed is:

1. An article having at least a polyolefin surface, provided with a mark obtained by exposing said surface to the action of a laser beam, wherein the polyolefin comprises a nondye laser radiation absorbing substance in an amount sufficient for decomposing the poly-olefin by the laser beam energy.

2. An article according to claim 1, wherein said polyolefin surface comprises a laser radiation absorbing substance in an amount comprised between 0.5 and 5% by weight.

3. An article according to claim 1, wherein the laser radiation absorbing substance is a silicon compound.

4. An article according to claim 2, wherein the laser radiation absorbing substance is a metal silicate.

5. An article according to claim 1, said polyolefin article being a container or cover for a container.

6. An article according to claim 1, wherein the polyolefin is selected from a group consisting of polyethylene and polypropylene.

7. An article, comprising:
   a polyolefin surface;
   a laser radiation absorbing substance mixed with the polyolefin;
   a decomposition of the polyolefin surface obtained by exposing the surface to a laser beam.

8. An article according to claim 7, wherein said polyolefin surface contains a laser radiation absorbing substance in an amount comprised between 0.5 and 5% by weight.

9. An article according to claim 7, wherein the laser radiation absorbing substance is a silicon compound.

10. An article according to claim 7, wherein the laser radiation absorbing substance is a metal silicate.

11. An article according to claim 7, wherein the polyolefin is chosen from one of polyethylene and polypropylene.

12. An article according to claim 1, wherein said polyolefin surface comprises a laser radiation absorbing substance in an amount comprised between 1 and 2% by weight.

13. An article according to claim 10, wherein the metal silicate comprises a calcium-metasilicate and/or an aluminum silicate.

14. An article according to claim 13, wherein the aluminum silicate is kaoline.

15. An article according to claim 7, wherein said polyolefin surface contains a laser radiation absorbing substance in an amount comprised between 1 and 2% by weight.

16. An article according to claim 4, wherein the metal silicate is a calcium-metalsilicate and/or an aluminum silicate.

17. Article according to claim 16, wherein the aluminum silicate is kaoline.

* * * * *